United States Patent [19]

Guthrie et al.

[11] Patent Number: 5,895,518

[45] Date of Patent: *Apr. 20, 1999

[54] SYNTHESIS OF ALLOYS WITH CONTROLLED PHASE STRUCTURE

[75] Inventors: Stephen Everett Guthrie; George John Thomas; Walter Bauer, all of Livermore; Nancy Yuan Chi Yang, Lafayette, all of Calif.

[73] Assignee: Sandia Corporation, Livermore, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/636,369

[22] Filed: Apr. 23, 1996

[51] Int. Cl.$^6$ .................... B22F 1/00; C22C 1/00
[52] U.S. Cl. ............... 75/351; 420/900; 420/407; 420/402; 148/420; 148/666; 148/667; 148/513; 75/352; 75/343; 75/357; 75/360
[58] Field of Search .................. 420/900, 407, 420/402; 75/351, 343, 357, 360, 352; 148/420, 666, 667, 513

[56] References Cited

U.S. PATENT DOCUMENTS

| | | | |
|---|---|---|---|
| 3,535,103 | 10/1970 | Whitfield | 75/0.5 |
| 4,126,242 | 11/1978 | Yajima et al. | 220/660 |
| 4,200,623 | 4/1980 | Muller et al. | 423/644 |
| 4,389,239 | 6/1983 | Klatt et al. | 75/0.5 |
| 4,402,933 | 9/1983 | De Pous | 423/658.2 |
| 4,457,891 | 7/1984 | Bernauer et al. | 420/434 |
| 4,537,761 | 8/1985 | Reed et al. | 423/644 |
| 4,613,362 | 9/1986 | Welter et al. | 502/328 |
| 4,716,736 | 1/1988 | Schwarz et al. | 62/46.2 |
| 5,391,366 | 2/1995 | Yamamoto et al. | 423/658.2 |

OTHER PUBLICATIONS

Sandrock, G. NATO ASI series, Kluwer Publishing, The Netherlands (in press) "Applications of Hybrides" pp. 1-28, no date available.

*Primary Examiner*—Robert Davis
*Assistant Examiner*—M. Alexandra Elve
*Attorney, Agent, or Firm*—Timothy Evans

[57] ABSTRACT

A method for preparing controlled phase alloys useful for engineering and hydrogen storage applications. This novel method avoids melting the constituents by employing vapor transport, in a hydrogen atmosphere, of an active metal constituent, having a high vapor pressure at temperatures ≈300 C. and its subsequent condensation on and reaction with the other constituent (substrate) of an alloy thereby forming a controlled phase alloy and preferably a single phase alloy. It is preferred that the substrate material be a metal powder such that diffusion of the active metal constituent, preferably magnesium, and reaction therewith can be completed within a reasonable time and at temperatures ≈300 C. thereby avoiding undesirable effects such as sintering, local compositional inhomogeneities, segregation, and formation of unwanted second phases such as intermetallic compounds.

19 Claims, 2 Drawing Sheets

SYNTHESIS OF ALLOYS WITH CONTROLLED PHASE STRUCTURE

STATEMENT OF GOVERNMENT INTEREST

This invention was made with Government support under contract no. DE - AC04 - 94AL85000 awarded by the U.S. Department of Energy to Sandia Corporation. The Government has certain rights in the invention.

BACKGROUND OF THE INVENTION

This invention pertains generally to an improved method for producing controlled phase metal alloy powders and particularly to a method of preparing single phase magnesium-based alloys for engineering and hydrogen storage applications.

Increasing demands for improved performance, especially in aerospace and automotive systems, have focused attention on enhancing material properties. Where weight considerations are at a premium the use of low density materials is essential. This is particularly true in the aircraft and automobile industries where light weight coupled with strength and formability are desired, here magnesium alloys are used to produce strong, lightweight parts. In addition to the engineering applications of magnesium alloys there are important specialized applications, hydrogen storage, for example, that make use of magnesium's unique properties. Single phase intermetallic alloys are especially desirable for these applications. However, these alloys pose special problems when traditional metallurgical fabrication procedures are employed.

Metal alloys are typically fabricated by melting together the constituents, which have been previously combined in the proper ratio, or combining the separate molten constituents in the proper proportion to produce the alloy composition desired, or by adding alloying metals to a molten master batch. These traditional processes suffer from several disadvantages, particularly with regard to preparing single phase alloys. Included among these is the tendency to form local compositional inhomogeneities, segregation, formation of undesired intermetallic compounds, lack of elemental interdiffusion and generally, the inability to control grain size and microstructure on a submicrometer basis. Magnesium containing alloys pose special problems because of the large differences in melting temperatures between magnesium and other metals used to alloy with magnesium as well as the significant vapor pressure of magnesium at temperatures even as low as 300° C.

One approach to producing single phase magnesium alloys has been the use of rapid solidification. Here, various atomization techniques are used to produce magnesium alloy powders. These powders are then consolidated by compaction or extrusion. The mechanical properties of the extruded material have been observed to be superior to magnesium alloys produced by conventional processes owing to structural refinements and the small grain size of the rapidly solidified particulate material. Substantial increases in longitudinal tensile strength and impact strength have been observed as compared to the same alloy extruded from conventional ingot material. Further, the ability to control grain size and microstructure on the submicrometer scale can provide additional structural applications for magnesium alloys and can enhance the potential for employing other metal forming techniques such as superplastic forming. On the other hand, there are numerous drawbacks associated with rapidly solidified magnesium alloys, in particular alloys produced by gas atomization, including non-uniformity of powder particle size, a high proportion of highly inflammable and adherent fines and the need to filter, clean and recycle large volumes of atomizing gas.

In addition to the utility of single phase magnesium alloys for engineering applications as set forth above, there is another important application of these magnesium alloys, hydrogen storage.

Growing energy needs coupled with the realization that supplies of conventional energy sources are not only not inexhaustible but also are becoming more costly have prompted the recognition that hydrogen can be used as an energy source. Hydrogen can be used as a fuel for internal combustion engines in place of hydrocarbons. It can also be used to fuel hydrogen-air fuel cells for the production of electricity. However, one of the problems posed by the use of hydrogen is its transportation and storage for which a number of solutions have been proposed. Among these are:

Storage under high pressure in steel cylinders. This method of storing hydrogen has the disadvantages of requiring storage of a hazardous gas under high pressure and the use of heavy containers which are difficult to handle.

Storage under cryogenic conditions entails not only the use of heavy containers but also the use of expensive and potentially hazardous cryogenic liquids.

Storage as a chemical compound, a hydride. In this case, hydrogen is released when required by simply decomposing the hydride either by lowering the pressure or heating the hydride, or both.

The storage of hydrogen as a hydride is well known in the art and numerous systems have been described wherein hydrogen is stored as an interstitial hydride or as a stoichiometric compound of the appropriate metal; the hydrogen then being released as required. Metal hydrides have the added advantage that they are reversible hydrogen storage systems. Of the various metals and metal alloys that form hydrides useful for hydrogen storage iron-titanium, lanthanum-nickel, vanadium, palladium and magnesium are the most popular.

Magnesium is the most useful of the hydride-forming metals because of its relatively low cost and light weight which allows for a theoretical capacity of 7.6% by weight of hydrogen. However, the use of the $Mg/MgH_2$ system for the reversible storage of hydrogen on a large scale poses several practical problems. For example, in order to have the maximum specific surface area for hydrogen absorption and thus for the conversion to $MgH_2$, the magnesium should be in the form of a powder. Magnesium powder having a high surface area can be produced by thermal decomposition of the hydride. The hydride can be produced initially by absorbing hydrogen onto magnesium at elevated temperature and pressure for a period of about six hours. This process can be repeated until magnesium powder of the desired size (or surface area) is produced. However, by most economic criteria, the cost of the $MgH_2$ prepared by these indirect techniques is too high to permit economical use of the magnesium powder thus obtained for the storage of hydrogen in the form of a hydride. Moreover, magnesium powders present serious handling and safety problems. Magnesium turnings, while not presenting the safety and handling problems of magnesium powder, have significant disadvantage as hydrogen storage materials namely, very severe hydriding conditions are required in order to convert turnings to $MgH_2$ thus rendering the use of turnings impractical notwithstanding the lower costs and other advantages associated with the use of this material.

The use of magnesium for the storage of hydrogen as a hydride is not entirely satisfactory due to the fact that a temperature of about 400° C. is required to decompose the hydride. These severe conditions lessen the practical use of magnesium metal and its hydride as a means of storing hydrogen. Moreover, because of its chemical reactivity metallic magnesium will rapidly oxidize in the presence of air and/or water vapor to form stable MgO or MgO surface layers. In order for hydrogen to be incorporated into bulk magnesium as $MgH_2$ it is necessary that the hydrogen molecules present on the magnesium surface be dissociated into hydrogen atoms. However, surface layers of MgO can inhibit the dissociation of hydrogen molecules into atomic hydrogen on the magnesium metal surface and the adsorption of the hydrogen atoms and their migration into bulk magnesium metal. Associated with the formation of surface layers is the fact that the hydrogen capacity of magnesium diminishes with cycling. As the number of decomposition-reconstitution cycles increases, the amount of hydrogen that can be taken up by the magnesium decreases.

It is desirable to provide conditions wherein the conversion ratio of $MgH_2/Mg$ is as high as possible in order to obtain the best utilization of magnesium. That is, the molar ratio $MgH_2/Mg$ should be as high as possible while the time required for absorption and desorption of hydrogen should be as low as possible and both the absorption temperature and pressure should likewise be as low as possible. The absorption temperature and pressure, the time required for complete hydrogenation of magnesium and the decomposition temperature and pressure can be reduced by providing a catalytic surface that serves to expedite the dissociation of molecular hydrogen into atomic hydrogen. It is known in the art that these catalytic surfaces are preferably alloys. The disadvantage of magnesium alloys for the purposes described is, as set forth above, that they are comparatively costly since they must be prepared by melting the elemental components together, casting the resulting melt and milling or grinding the cast body to a fine powder capable of absorbing hydrogen.

The prior art discloses numerous attempts both to improve the hydrogen storage capacity of magnesium as well as to overcome the difficulties associated with hydriding/dehydrding magnesium. U.S. Pat. No. 4,200,623 discloses the preparation of hydrogen storage systems by mixing together magnesium metal powder and a powder selected from at least one of groups IA, IIIB, IVB, VIB, VIIB and VIII, compacting the mixture and then hydrogenating the compacted mixture by heating in hydrogen at temperatures between 400° C. and 1600° C. U.S. Pat. No. 4,402,933 describes a method of hydrogen storage, wherein magnesium powder is intimately mixed, e.g., by ball milling, with powders selected from the group consisting of inert metals, metal alloys, metal oxides, carbides and nitrides. The mixture is then hydrogenated by heating in hydrogen, typically at high pressure ($\approx$30 bar) for about 15 hrs. at between 350° C. and 400° C. U.S. Pat. No. 4,613,362 discloses a method for hydrogen storage that employs an magnesium/iron granulate, wherein the iron content is between 1% and 20% by weight. Hydrogen charging of the magnesium/iron granulate takes place at a constant pressure of 1.5 MPa and a temperature of 400° C. U.S. Pat. No. 4,537,761 discloses a hydrogen storage system comprising magnesium alloys, preferably Mg/Cu alloys, that are subjected to a plurality of sequential activating cycles at elevated temperatures and hydrogen gas pressures. The purpose of the plurality of hydrogenation/dehydrogenation cycles is to produce a magnesium alloy having a high surface area, thereby more readily promoting hydrogenation of the magnesium alloy. While the prior art recognized the advantage magnesium alloys offered in overcoming problems associated with hydrogenation/dehydrogenation of magnesium metal, as set forth above, the solutions disclosed were either to start with expensive magnesium alloys that can contain local compositional inhomogeneities, segregation, undesired intermetallic compounds, and/or uncontrolled grain size; to employ elaborate fabrication steps to prepare the desired alloy that, because of lack of control of the fabrication step(s), are not capable of producing a preferred single phase alloy; or to subject the alloy to a plurality of time consuming and uneconomic hydrogenation/dehydrogenation cycles, generally at high pressure, in order to provide sufficient reactive surface.

Thus, there is a continuing need for an inexpensive method of producing controlled and preferably single phase metal alloy powders, particularly single phase magnesium-based alloy powders, useful for engineering and hydrogen storage applications. It is desirable that the powders that are a product of this method require no further processing and further, that the alloy powders possess a catalytic surface for the dissociation of molecular hydrogen into atomic hydrogen.

Responsive to these needs, a novel method for preparing single phase alloy metal powders, particularly magnesium-based alloy metal powders, is disclosed herein. The advantages of this novel method of preparing alloy metal powers are severalfold. First the product produced by this process is a single phase alloy. Second, the product, is a powder, therefore, the expensive operations involved in reducing an ingot or cast product to a powder are eliminated. Third, the particle size distribution of the final product can be fixed by the powder chosen as the other component of the alloy. Fourth, by virtue of the smaller grain size, the mechanical properties of the alloys produced by the present invention possess superior properties. Fifth, the alloy powder can be fabricated into desired shapes by standard powder metallurgical techniques. All these aspects of the present invention for producing single phase alloys lend much greater control over the final product.

SUMMARY OF THE INVENTION

A method of preparing controlled phase alloys, particularly single phase alloys, and preferably single phase magnesium alloys, at low temperatures is disclosed herein which takes advantage of the high vapor pressure and reactivity of certain metals, particularly metallic magnesium, at temperatures $\approx$300° C. In contrast to the prevalent practice of melting an intimate mixture of metal powders that constitute an alloy, the process set forth herein uses the vapor transport of a high vapor pressure metal (hereinafter known as the active metal) to cause active metal vapor to condense onto and subsequently react with a fine powder of the other component (hereinafter known as the substrate metal) to form a single phase intermetallic alloy. Placement of all the reactants in a single vessel, preferably in separate parts, and under a hydrogen atmosphere, at a sufficient reaction temperature to cause the active metal to vaporize, establishes a vapor equilibrium that is maintained until all the active metal reactant is used up at which time the vapor pressure will drop. Thus, a single phase alloy powder can be formed at temperatures below the melting point of its constituents thereby avoiding the undesirable effects typically encountered during the conventional melting and casting operations employed during preparation of alloys such as, local compositional inhomogeneities, segregation, and formation of unwanted intermetallic compounds. The process described herein not only provides a homogeneous single phase alloy powder but also eliminates the need for post-processing of the alloy, such as milling or grinding, to produce a powder and further, yields a powder product having a particle size that can be predetermined and controlled.

DETAILED DESCRIPTION OF THE INVENTION

Figure 1:
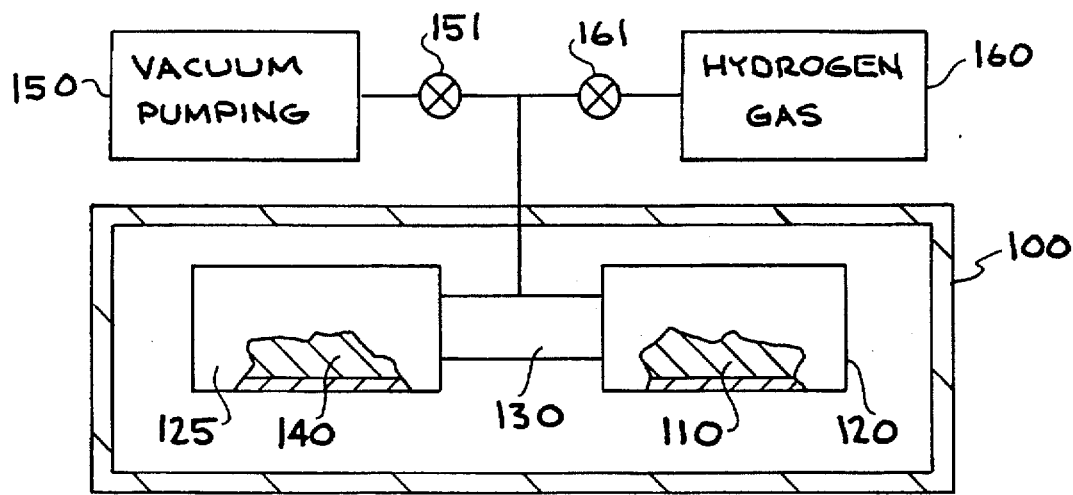
FIG. 1 shows an embodiment of the present invention.

The present invention comprises a novel method for the synthesis of alloys with controlled phase structure, and preferably single phase alloys, particularly adapted for use in hydrogen storage applications.

The process for fabricating controlled phase alloys disclosed in the present invention relies on the vapor transport of the constituent with the highest vapor pressure (the active metal constituent) and its subsequent condensation on and reaction with the other constituent (substrate constituent) of the alloy being made. It is preferred that the substrate constituent have a high surface area and be in such a form, preferably a powder, that diffusion of the active metal constituent, preferably magnesium, and reaction therewith can be completed within a reasonable time. It will be appreciated that because the reaction temperature is kept low, below the melting point of either constituent, and preferably ≈300° C., if it is desired to produce an alloy that contains more than one substrate constituent (a ternary or higher alloy), it is preferable that the substrate constituents will have been previously combined together and be available as a powder.

The presence of water vapor in the reaction vessel can consume some of the active metal constituent at the reaction temperature thereby making it unavailable to react with the substrate constituent. Furthermore, the presence of oxide coatings on the active metal and/or substrate constituents can impede subsequent alloying reaction. The inventors have found that a pretreatment step comprising heating both the active metal and substrate constituents in a low pressure hydrogen atmosphere at a temperature of about 100° C.–150° C. can mitigate the adverse effects of water vapor and oxide coatings on subsequent alloy formation reactions.

A preferred embodiment of the present invention comprises:

a) adding a substrate metal selected from at least one of Group IB, IIB, IIIA, IIIB or VIII of the Periodic Table and combinations thereof, to a reaction vessel, wherein the substrate metal is a powder having an average particle size or diameter less than about 100 µm;

b) adding an active metal, preferably magnesium, to the reaction vessel either as an admixture with the substrate metal powder or, preferably, in a separate part of the reaction vessel;

c) sealing the vessel;

d) reducing the pressure within the vessel to at least about $10^{-4}$ Torr and preferably to at least about $10^{-6}$ Torr;

e) admitting hydrogen gas into the reaction vessel until the pressure is about 1 atm.;

f) raising the temperature of the reaction vessel to a temperature of at least 100° C. and holding for a time sufficient to remove water vapor and oxide coatings from the active metal and substrate metal powder particles;

g) raising the temperature of the reaction vessel to a temperature below the melting point of either constituent and preferably at least 300° C.;

h) maintaining the temperature for a period of time sufficient to cause the constituents to react together to form a single phase alloy, preferably at least eight hours; and i) cooling the reaction vessel to room temperature.

Oxide impurities which may have been on the surface of a substrate metal powder or magnesium, and not removed by hydrogen treatment, can accumulate at the interstices of the alloy powder particles permitting their easy removal following the completion of the alloying reaction. By maintaining the reaction temperature at less than about 350° C. the alloy powder will not sinter (i.e., remain as a powder) permitting subsequent fabrication by powder metallurgy methods.

The present invention now will be described more fully hereinafter by way of various examples illustrative of the invention. This invention may, however, be embodied in many different forms and should not be construed as limited to the embodiments set forth herein.

EXAMPLE 1

Referring now to FIG. 1. A quantity of nickel substrate powder 110 having an average particle size of about 50 µm is placed in a stainless steel reaction vessel 120 which is connected to a vacuum fitting on duct 130 inside an oven 100. A quantity of magnesium 140 is placed into a stainless steel reaction vessel 125 which is also connected to vacuum fitting 130. The molar ratio of magnesium to nickel is slightly greater than about 2:1. Vacuum fitting 130 is, in turn, connected to a vacuum pumping station 150 and a source of hydrogen gas 160. Valve 151 is opened to directly connect vacuum pumping station 150 with reaction vessels 120 and 125 thereby lowering the pressure in reaction vessels 120 and 125 to about $10^{-6}$ torr. After closing valve 151, valve 161 is opened to admit hydrogen gas to a pressure of about 1 atm. When a pressure of about 1 atm of hydrogen gas has been attained in reaction vessels 120 and 125, valve 161 is closed and reaction vessels 120 and 125 are jointly heated to between about 100° C.–150° C. for about 3 hrs. Following this step, which comprises removing residual water vapor and oxide coatings on the constituent metals (i.e., nickel and magnesium), valve 151 is reopened to pump out the overpressure gas and hydrogen is readmitted to reaction vessels 120 and 125 at a pressure of about 1 atm. After closing valves 151 and 161, reaction vessels 120 and 125 are heated to a temperature of about 300° C., thereby causing the magnesium 140 to vaporize, diffuse to and be deposited on nickel metal substrate powder 110 contained in reaction vessel 120 where the magnesium subsequently reacts with the nickel substrate powder. In order to effect complete reaction between magnesium and nickel reaction vessel 125 is maintained at about 300° C. for a period of time whose length depends upon the size of the nickel substrate powder particles, but preferably for at least about 8 hours.

EXAMPLE 2

A single phase alloy was prepared exactly as described in Example 1 except that the substrate powder was aluminum.

Figure 2:
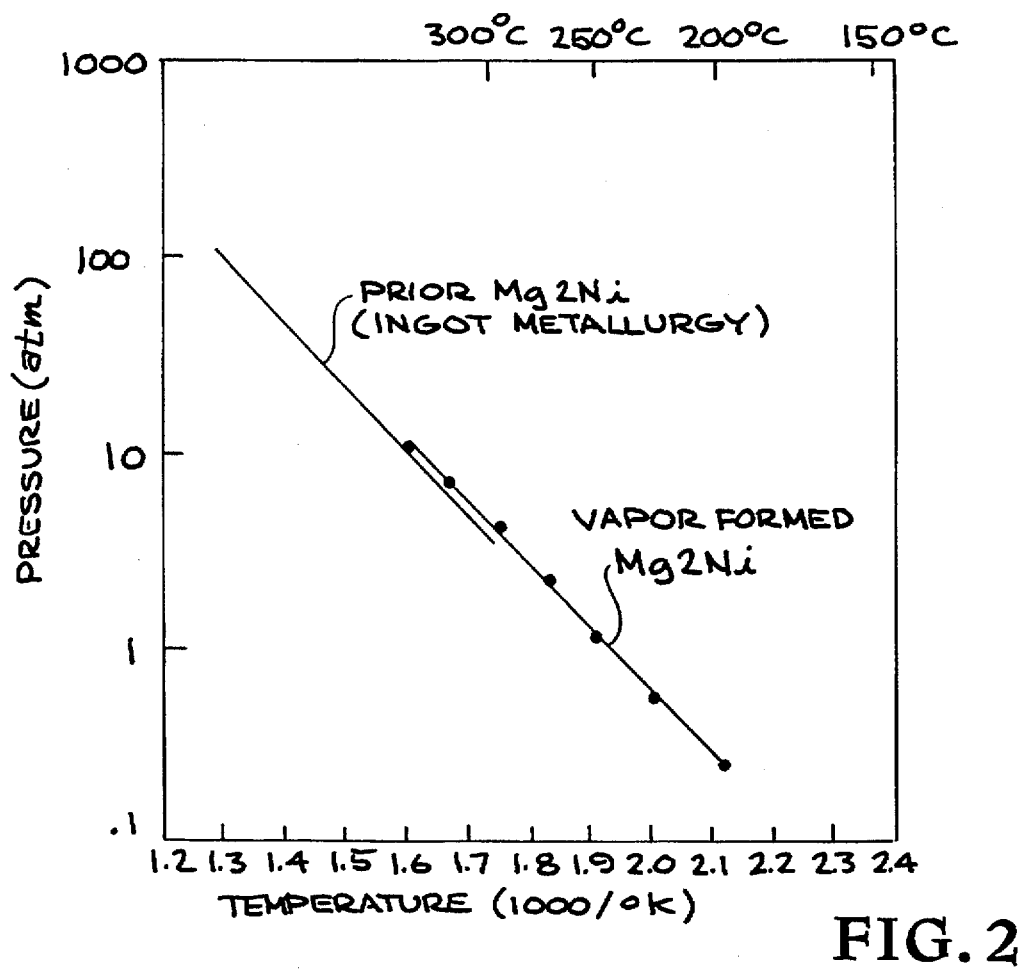
FIG. 2 compares the vapor pressure of hydrogen over conventional ingot metallurgy produced $Mg_2Ni$ and $Mg_2Ni$ produced by the method of the present invention.
Figure 3:
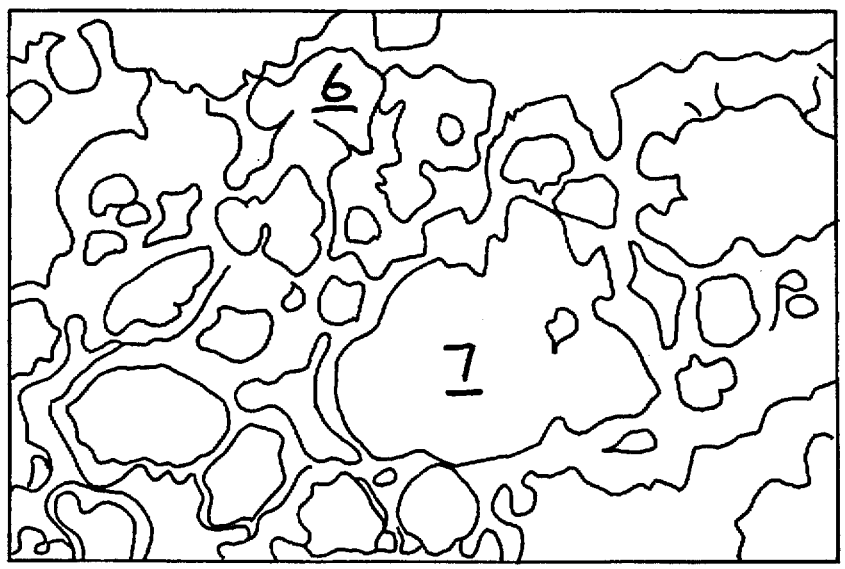
FIG. 3 is a photomicrograph of the electron microprobe analysis of a sample of a magnesium/nickel alloy produced by the method of the present invention.

The inventors have found that controlled phase alloys, and particularly single phase magnesium alloys, prepared by the method of the present invention are useful for hydrogen storage applications. FIG. 2 shows the hydrogen pressure as a function of temperature for the alloy $Mg_2Ni$ made by conventional ingot metallurgy processes and the same alloy produced by the method of the present invention. It can be seen that the $Mg_2Ni$ alloy produced by the method of the present invention exhibited greatly improved low temperature behavior, slightly higher hydrogen pressures at elevated temperatures and improved kinetic behavior as compared to the conventionally formed alloy. It is believed that the single phase nature of the vapor formed alloy, as shown by the electron microprobe micrograph of FIG. 3, is responsible for the improved behavior observed. Here, the periphery of the nickel substrate powder particles 7 and those nickel substrate powder particles less than about 50 μm in diameter have been completely converted to the single phase alloy $Mg_2Ni$ 6 during the time the reaction vessel was maintained at the reaction temperature of about 300° C.

Figure 4:
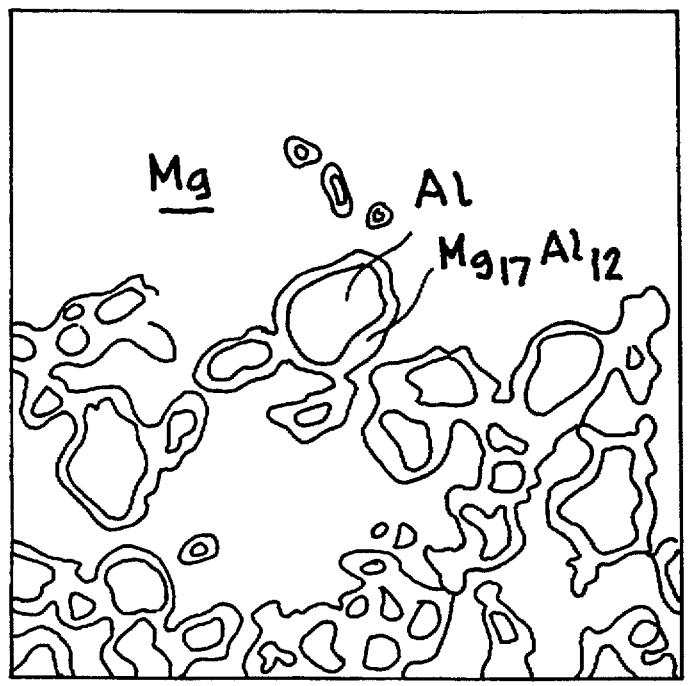
FIG. 4 is a photomicrograph of the electron microprobe analysis of a sample of a magnesium/aluminum alloy produced by the method of the present invention.

Similarly, FIG. 4 shows a electron microprobe micrograph of a magnesium/aluminum alloy produced by the method of the present invention. For the particular reaction conditions employed in this example, the periphery of the aluminum substrate powder as well as those aluminum particles that were less than about 30 μm in diameter hve been completely converted to the single phase $Mg_{17}Al_{12}$ alloy.

From the foregoing description and examples, one skilled in the art can readily ascertain the essential characteristics of the present invention. The description and examples are intended to be illustrative of the present invention and are not to be construed as limitations or restrictions thereon, the invention being delineated in the following claims.

We claim:

1. A method for preparing a controlled phase metal alloy, comprising the steps of:
   a) placing a first metal into a first chamber of a reaction vessel and a second metal into a second chamber of said reaction vessel, said first and second chambers connected by a duct, said duct permitting said chambers to share a common atmosphere, said first metal having first vapor pressure, said second metal having a second vapor pressure, said first vapor pressure substantially greater than said second vapor pressure;
   b) evacuating said reaction vessel thereby removing said common atmosphere;
   c) introducing hydrogen gas into said reaction vessel as a reaction atmosphere;
   d) heating said reaction vessel to a first temperature, said first temperature at least 100° C., said first temperature maintained for about 3 hours;
   e) increasing said first temperature to a second temperature, wherein said second temperature is substantially less than the melting point of either said metal but sufficiently high to establish a first metal partial pressure above about $10^{-6}$ torr within both said chambers; and
   f) maintaining said reaction vessel at said second temperature for a second interval of time, said second interval sufficiently long to permit said first metal to be deposited on, and react with, said second metal thereby forming an alloy.

2. A method for preparing a single phase magnesium alloy powder having a given particle size distribution, comprising the steps of:
   a) placing magnesium powder into a first chamber of a reaction vessel, and a second metal powder into a second chamber of said reaction vessel, said first and second chambers connected by a duct, said duct permitting said chambers to share a common atmosphere, said second metal powder having a vapor pressure substantially less than magnesium;
   b) evacuating said reaction vessel thereby removing said common atmosphere;
   c) introducing hydrogen gas into said reaction vessel as a reaction atmosphere;
   d) heating said reaction vessel to a first temperature, said first temperature at least 100° C., said first temperature maintained for about 3 hours;
   e) increasing said first temperature to a second temperature, wherein said second temperature is below the melting point of either metal powder, said second temperature sufficiently high to establish a partial pressure of magnesium above about $10^{-6}$ torr within both said chambers; and
   f) maintaining said reaction vessel at said second temperature for a second interval of time, said second interval sufficiently long to permit magnesium vapor to be deposited on, and react with, said second metal powder thereby forming an alloy.

3. The method of claim 1 wherein the first metal is magnesium.

4. The method of claim 1 wherein the second metal comprises a metal powder.

5. The method of claim 4 wherein the metal powder is selected from at least one of the group consisting of Group IB, IIB, IIIA, IIIB or VIII of the Periodic Table and combinations thereof.

6. The method of claim 1 wherein the second metal is nickel.

7. The method of claim 1 wherein the second metal is aluminum.

8. The method of claim 1 wherein the second metal comprises a powder having an average particle size of less than 100 μm.

9. The method of claim 5 wherein the second metal comprises a powder having an average particle size of less than 50 μm.

10. The method of claim 1 wherein said step of evacuating includes removing said common atmosphere to a pressure of at least less than $10^{-4}$ torr.

11. The method of claim 1 wherein said step of introducing hydrogen gas includes introducing at least about 1 atmosphere of hydrogen gas.

12. The method of claim 1 wherein the first temperature is between about 100° C. and 150° C.

13. The method of claim 1 wherein the second temperature is at least 250° C.

14. The method of claim 2 wherein the second metal comprises a metal powder having a particle size distribution, wherein the particle size distribution of the metal powder determines the particle size distribution of the single phase magnesium alloy powder.

15. The method of claim 14 wherein the metal powder is selected from at least one of the group consisting of Group IB, IIB, IIIA, IIIB or VIII of the Periodic Table and combinations thereof.

16. The method of claim 2 wherein said step of evacuating includes removing said common atmosphere to a pressure of at least less than $10^{-4}$ torr.

17. The method of claim 2 wherein said step of introducing hydrogen gas includes introducing at least about 1 atmosphere of hydrogen gas.

18. The method of claim 2 wherein the first temperature is between about 100° C. and 150° C.

19. The method of claim 2 wherein the second temperature is at least 250° C.

* * * * *